United States Patent [19]

Prillard

[11] Patent Number: 5,143,678
[45] Date of Patent: Sep. 1, 1992

[54] ANGLED SUPPORT ARM FOR A SUN-VISOR WHICH IS ELECTRICALLY POWERED BY CONDUCTORS

[75] Inventor: Charles B. Prillard, Rupt sur Moselle, France

[73] Assignee: Rockwell ABS - France, Paris, France

[21] Appl. No.: 667,447

[22] Filed: Mar. 11, 1991

[30] Foreign Application Priority Data

Mar. 13, 1990 [FR] France ................ 90 03194

[51] Int. Cl.⁵ .............................. B28B 7/22
[52] U.S. Cl. .................... 264/255; 296/97.5; 362/144
[58] Field of Search ............... 248/56; 160/DIG. 3; 264/255, 272.11, 272.16; 296/97.12, 97.13, 97.5, 97.1; 362/74, 144, 141, 142, 135

[56] References Cited

U.S. PATENT DOCUMENTS

| | | |
|---|---|---|
| 4,041,241 | 8/1977 | Olmstead ................ 248/56 |
| 4,272,118 | 6/1981 | Viertel et al. ................ 296/97.5 |
| 4,363,511 | 12/1982 | Viertel et al. ................ 296/97.5 |
| 4,390,202 | 6/1985 | Flowerday . |
| 4,740,028 | 4/1988 | Connor ................ 296/97.5 |
| 4,847,737 | 7/1989 | Van Order et al. .......... 362/144 X |
| 4,849,582 | 7/1989 | Stevenson ................ 248/56 |
| 4,879,637 | 11/1989 | Clark et al. ................ 296/97.5 X |
| 4,901,395 | 2/1990 | Semrau ................ 248/56 |
| 4,947,296 | 8/1990 | Takeuchi et al. .......... 296/97.5 X |
| 4,979,079 | 12/1990 | Tawaraya ................ 362/144 X |
| 5,054,839 | 10/1991 | White et al. ................ 296/97.1 |
| 5,067,764 | 11/1991 | Lanser et al. ................ 296/97.5 |

FOREIGN PATENT DOCUMENTS 3338279 5/1985 Fed. Rep. of Germany .
2210836 6/1989 United Kingdom .

Primary Examiner—David M. Purol
Attorney, Agent, or Firm—Notaro & Michalos

[57] ABSTRACT

An angled support arm for a sun-visor which is electrically powered by at least two conductors passing inside the support arm. The support arm is made by molding a plastic material over at least a portion of the conductors in such a manner as to cause the plastic material to constitute a block with the conductors. In the method of the invention, overmolding takes place in two stages: a first stage in which a plastic material is molded over the conductors in such a manner as to obtain a support arm blank having at least a portion which is smaller in section than the corresponding section of the support arm; and a second stage during which the blank is itself overmolded to obtain the finished support arm.

12 Claims, 3 Drawing Sheets

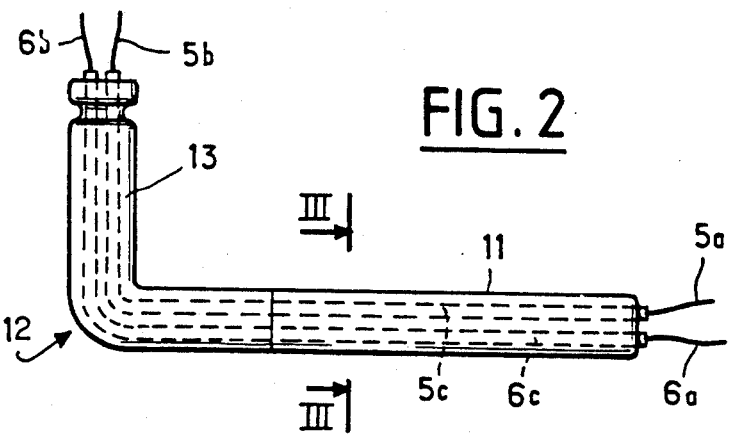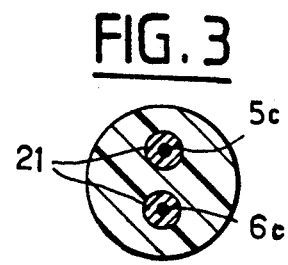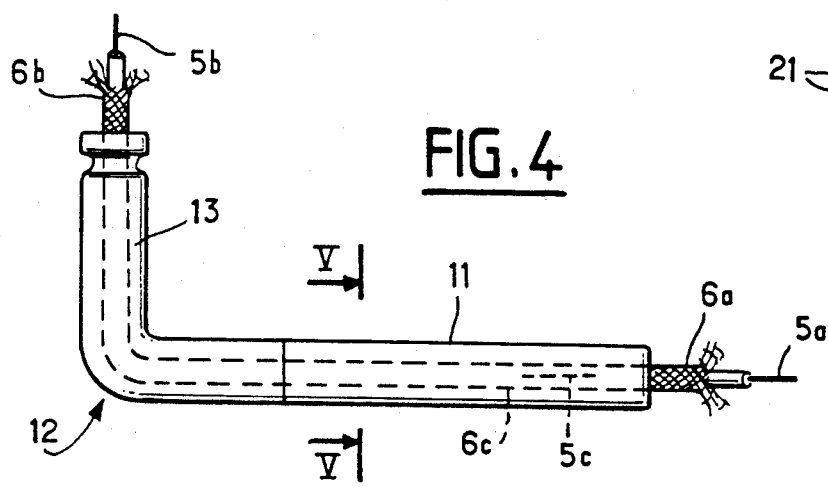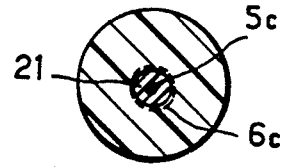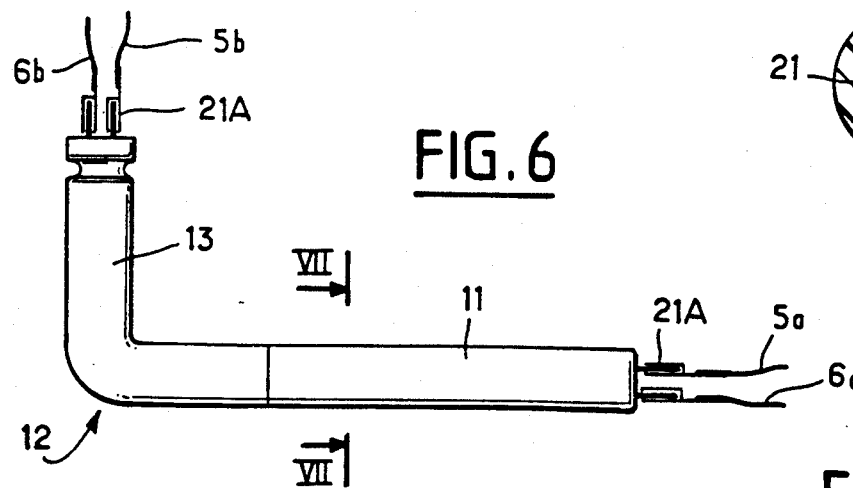

ANGLED SUPPORT ARM FOR A SUN-VISOR WHICH IS ELECTRICALLY POWERED BY CONDUCTORS

The present invention relates to an angled support arm for a sun-visor which is electrically powered by at least two conductors.

BACKGROUND OF THE INVENTION

There already exist sun-visors for motor vehicle passenger compartments in which the sun-visors are provided with courtesy mirrors capable of being illuminated by bulbs powered by pairs of electrical conductors which are themselves connected to feed wires hidden in the roof. These conductors may pass to one side of the sun-visor support arm, but for reasons of appearance it is preferable to hide them by causing them to pass inside the support arm. That is why the support arm of an electrically-powered sun-visor is conventionally made by molding plastic material over an insert. The insert may be a hollow tube with at least one electrical conductor wire being caused to pass along the bore thereof. The tube is generally made of metal and may act as the second conductor which is connected to ground.

Cabling such a support arm nevertheless suffers from difficulties since the support arm is angled to enable the sun-visor to pivot both about a horizontal axis and about a vertical axis.

The hollow insert must therefore be angled before plastic is molded thereover, and this may give rise to kinking or constriction at the angle in the duct. This can give rise to difficulties in passing the conductor wire(s), and even to manufacturing rejects. Support arms made in this way are expensive because of the operations required for making the inserts, for bending them, and for passing the conductor wires. To this, it is also necessary to add the costs of connectors for connecting the ends of the insert firstly to the bulb, and secondly to ground or to a feed wire.

Another prior method of making a support arm is to mold plastic material over a solid metal insert. The insert then constitutes one of the electrical feed conductors for the sun-visor. In this case, the second conductor is provided via the other sun-visor support rod which holds the end thereof that is distant from the support arm by co-operating with a notch fixed to the roof and referred to as the central hook.

This solution has the advantage of proposing a support arm which is particularly strong, however it suffers from the drawback of requiring good electrical contact to be made between said rod and said notch when the vanity mirror is to be illuminated, and the lighting provided in the sun-visor does not work unless the rod is engaged in the notch. This disposition using another support rod considerably increases cost prices.

An object of the present invention is to provide a support arm for a sun-visor which is electrically powered by two conductors passing along the inside of said support arm and which can be made in a manner which is simple and cheap. The sun-visor may be fitted with an illuminated mirror or with any other electrically operated accessory.

SUMMARY OF THE INVENTION

The object is achieved by the invention by virtue of the fact that said support arm is made by molding a plastic material over at least a portion of said conductors in such a manner as to cause said plastic material to constitute a block with said conductors.

Before the plastic material is molded over the conductors, they may be covered with an electrically insulating covering, in which case the material of the covering must be capable of withstanding without damage the temperatures of the plastic material injected during overmolding. The conductors may be standard type flexible electric wires or a coaxial type wire. Flexibility may be adapted to improve the strength of the wires. The outer sheath of a coaxial type wire is preferably constituted by a braid of metal wires. This electrically conductive sheath may then be used as one of the feed conductors.

The conductors may also be constituted by spaced-apart blades which are held by an electrical insulator and which are embedded in the plastic material on molding.

The present invention also relates to a method of making an angled support arm of the invention.

Present angled support arms are already made by molding plastic material over an insert that may be solid or hollow. The insert is positioned in the mold cavity and is kept at a distance from the walls thereof by tongues fixed to the mold. These tongues increase the cost of fabricating the mold and they also give rise to slots that are open to the outside wall of the finished support arm, with said slots reducing the strength thereof.

Methods are also known for covering a flexible electrical wire with an insulating layer. In these methods, a wire to be covered is paid out continuously and is kept rectilinear and taut during a covering stage so that the insulating material covers the entire outside surface of the wire to a substantially uniform thickness. Such processes cannot be used for overmolding flexible electrical wires for the purpose of making angled support arms of the present invention since the wires are angled inside the mold and therefore cannot be kept taut by traction. Naturally it would be possible to design a mold that included multiple guides for keeping the wires away from its walls. However, under such circumstances, the resulting support arm would have too many slots and would become too fragile.

An object of the present invention is to mitigate these drawbacks.

According to the present invention, this object is achieved by the fact that a plastic material is molded over at least a portion of said conductors in two stages:

a first stage in which a plastic material is molded over said portion of the conductors in such a manner as to obtain a support arm blank having at least a portion thereof which is smaller in section than the corresponding section of said support arm; and a second stage during which said blank is itself overmolded to obtain said finished support arm.

In a variant of the invention, the plastic material used in the second stage may be different from the plastic material used in the first stage.

No particular precautions need be taken when placing the conductor wires in the first mold. The blank may have zones in its outside walls where one of the conductors is visible, but this is of little importance since the rigid blank is itself overmolded in the following stage in the same manner as an insert is overmolded to provide a prior art support arm.

Advantageously, the end portions of said support arm are made during the first stage and overmolding of the angled portion is terminated during the second stage.

This makes it possible to have molds that do not require tongues for supporting the blank during the second overmolding stage since the ends of the support arm have already been terminated and can be used for holding the blank inside the second mold during the second overmolding stage.

BRIEF DESCRIPTION OF THE DRAWINGS

Embodiments of the invention are described by way of example with reference to the accompanying drawings, in which:

FIG. 2 shows a sun-visor support arm of the invention in which two insulated electrical wires are embedded in plastic material constituting the support arm;

FIG. 3 is a section on line III—III of FIG. 2;

FIG. 4 shows a sun-visor support arm of the invention in which a coaxial cable is embedded in the plastic material;

FIG. 5 is a section on line V—V of FIG. 4;

FIG. 6 shows a sun-visor support arm of the invention in which two metal blades are embedded in the plastic material;

FIG. 7 is a section on line VII—VII of FIG. 6;

DETAILED DESCRIPTION

Figure 1:
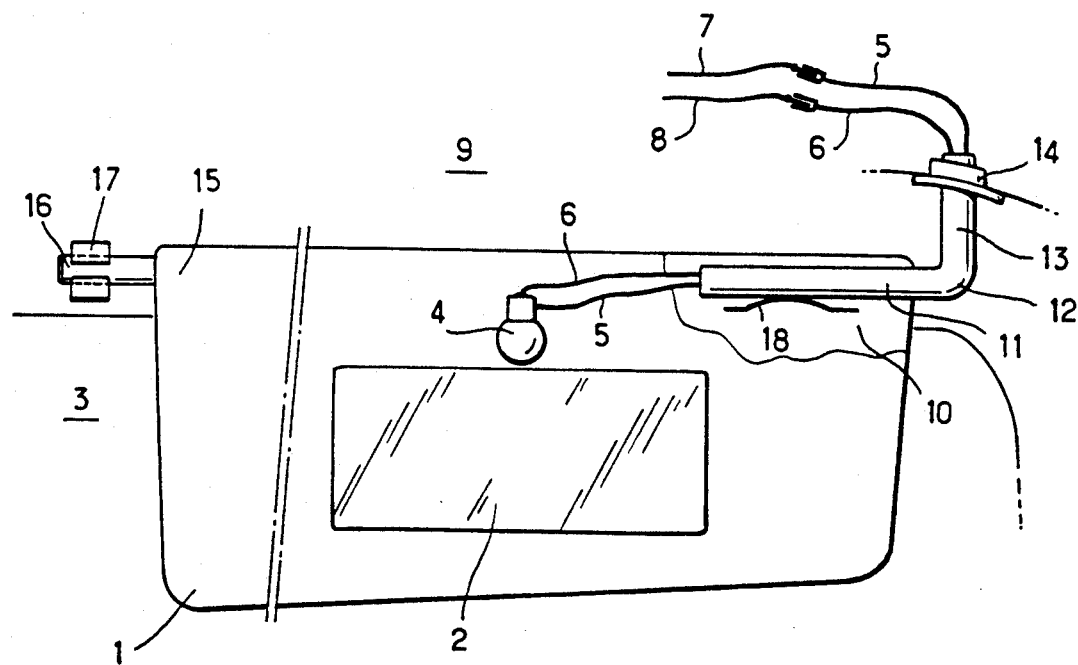
FIG. 1 is a diagram showing the principle of a sun-visor which is electrically powered by means of two conductors.

FIG. 1 shows a sun-visor 1 for a car passenger cabin and including a courtesy mirror 2 that may be illuminated, at least when the visor is folded down against the windshield 3, by means of a lamp 4 which is powered by two conductors 5 and 6. The conductors 5 and 6 are themselves connected to feed wires 7 and 8 that are hidden in the roof 9. The sun-visor 1 is supported at one of its ends 10 by the horizontal branch 11 of an L-shaped angled support arm 12 whose vertical branch 13 is pivotally mounted on a base 14 fixed to the roof 9. The other end 15 of the sun-visor is supported by a support rod 16 suitable for co-operating by snap-fastening in a notch 17 fixed to the roof 9. The sun-visor 1 is suitable for pivoting about the horizontal branch 11 of the support arm 12 and for remaining stationary either in a lowered position against the windshield 3, or else in a raised position against the roof by virtue of flat springs 18 co-operating with flats formed on the wall of the horizontal branch 11 of the support arm 12.

For reasons of appearance, the conductors 5 and 6 pass along the core of the support arm 12. The portions 5a, 5b, and 6a, 6b of the conductors 5 and 6 that are situated outside the support arm 12 are preferably constituted by flexible electric wires covered with respective insulating coverings 21.

According to the invention, the portions 5c and 6c of the conductors 5 and 6 which pass through the support arm 12 are intimately connected to the support arm 12 since the support arm is made by molding plastic material over said portions 5c and 6c.

The portions 5c and 6c may be constituted by any type of electrical conductor, which may be bare or electrically insulated.

When the portions 5c and 6c are bare type electrical conductors, they may be constituted by copper blades as shown in FIGS. 6 and 7, which blades are angled and disposed separate from each other in a suitable mold into which the plastic material forming the support arm 12 is injected. The portions 5a, 5b, 6a, and 6b are then fixed by means of connectors 21A to the ends of the copper blades which project from the plastic material at the free ends of the branches 11 and 13.

When the portions 5c and 6c are insulated type electrical conductors, it is advisable for the portions 5c and 6c in association respectively with the portions 5a and 5b and 6a and 6b to constitute two electrically insulated electric wires.

In this case, the two conductors 5 and 6 may be constituted by two flexible and insulated electric wires as shown in FIGS. 2 and 3, with the insulating coverings 21 of the wires being designed to withstand the injection temperatures of the plastic material.

The conductors may also be in the form of a coaxial cable as shown in FIGS. 4 and 5. The sheath of the coaxial cable is preferably made of a braid of metal wires constituting the second conductor 6.

The overmolding of the portions 5c and 6c of the conductors 5 and 6 preferably takes place in two overmolding stages, so that in an intermediate stage a blank 22 is obtained in which at least the angled portion is smaller in section than the final support arm 12.

Figure 8:
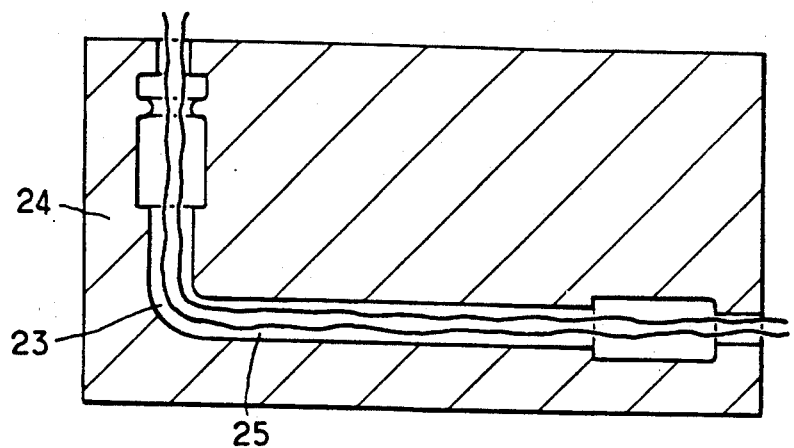
FIG. 8 shows a first mold for forming a support arm blank.
Figure 10:
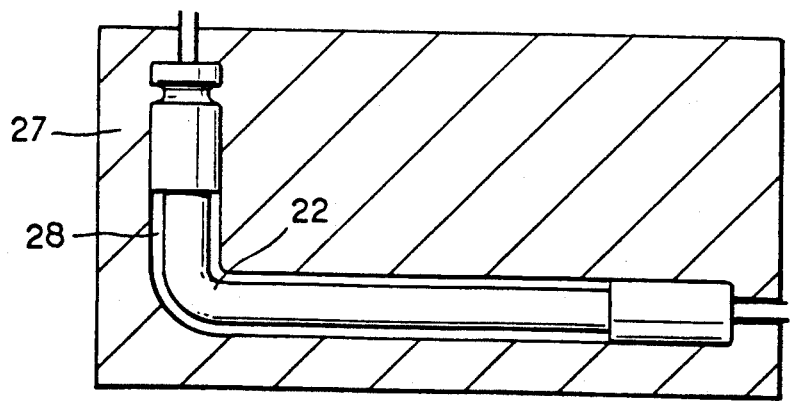
FIG. 10 shows a second mold for overmolding the blank of FIG. 9.

FIGS. 8 and 10 show the half-molds used in each of the overmolding stages. As can be seen in FIG. 8, the cavity 23 in the first mold 24 is smaller in section in its angled midportion 25 than the support arm 12 that is to be obtained.

Figure 9:
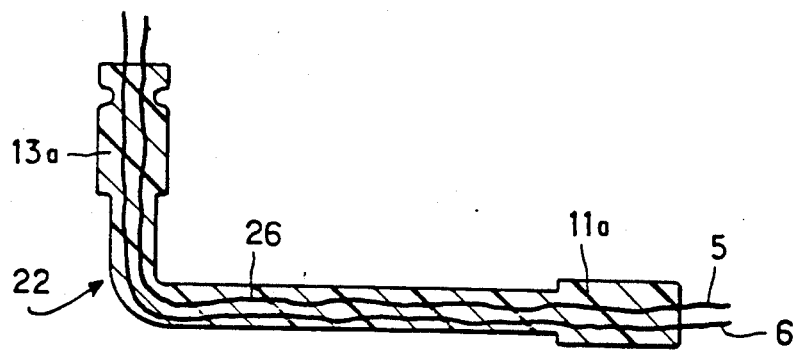
FIG. 9 is a section through a support arm blank obtained during the first overmolding stage.

The first mold 24 serves to provide a blank 22 as shown in FIG. 9, in which it can be seen that the ends 11a and 13a of the branches 11 and 13 have the final dimensions of the ends of the branches 11 and 13. The conductors 5 and 6 may be apparent in the angled intermediate portion 26. The conductors 5 and 6 are disposed in the cavity 23 without taking any particular precautions and they may come into contact with the walls delimiting the middle angled region of the cavity 23.

Figure 11:
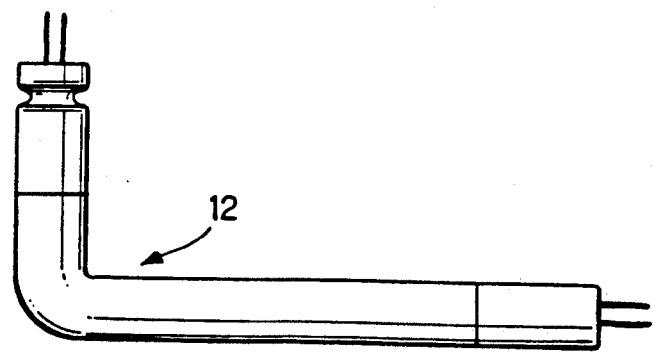
FIG. 11 shows the support arm obtained from the second overmolding stage.

The second mold 27 shown in FIG. 10 has a cavity 28 whose dimensions correspond to the dimensions of the support arm 12. The blank 22 obtained from the first mold 24 is overmolded in this second mold 27. The ends 11a and 13a of the blank enable the intermediate portion 26 of the blank 22 to be held away from the walls delimiting the cavity 28. A plastic material (which may be different in composition from that constituting the blank 22) is injected into the angled portion 30 of the cavity 28, thereby making it possible to obtain the support arm 12 as shown in FIG. 11.

I claim:

1. An angled support arm for a sun-visor, said support arm being made of a plastic material and supporting at least two electrical conductors, wherein said plastic material is molded over at least a portion of said conductors by injection in two stages, said support arm being made by the process comprising:

a first stage in which a plastic material is molded over said portion of said conductors in a first mold to obtain a support arm blank in which said plastic material constitutes a block with said portion of said conductors therein, said blank having at least a portion thereof which is smaller in section than a corresponding section of said support arm; and a second stage in which said blank is itself qvermolded by a plastic material to complete said support arm.

2. A support arm according to claim 1, in which the conductors are constituted by spaced-apart metal blades held by insulating material and embedded in said plastic material.

3. A support arm according to claim 1, wherein each of said conductors is constituted by a flexible electrical wire covered with a layer of an insulating covering, said insulating covering withstanding the injection temperatures of said plastic material.

4. A support arm according to claim 1, wherein said conductors are combined in a coaxial type cable.

5. A support arm according to claim 4, wherein said coaxial cable has an outer sheath constituted by a metal braid.

6. A support arm according to claim 1, having a plastic material over at least a portion of its outside surface which is different from the plastic material surrounding said conductors.

7. A method of making an angled support arm for a sunvisor, said support arm being made of a plastic material and supporting at least two electrical conductors, a portion of said conductors passing through said support arm, wherein said plastic material is molded over said portion of conductors by injection in two stages comprising:

a first stage in which a plastic material is molded over said portion of said conductors in a first mold to obtain a support arm blank in which said plastic material constitutes a block with said portion of said conductors therein, said blank having at least a portion thereof which is smaller in section than a corresponding section of said support arm; and a second stage in which said blank is itself overmolded in a second mold by a plastic material to obtain said finished support arm.

8. A method accoring to claim 7, wherein the plastic material used in the second stage is different from the plastic material used in the first stage.

9. A method according to claim 7, wherein the end positions of the support arm are formed during the first stage and wherein the overmolding of the angled portion is terminated during the second stage.

10. A method of making an angled support arm for a sunvisor, said support arm being made of a plastic material and supporting at least two electrical conductors, portions of said electrical conductors passing through said support arm, the method comprising the steps of:

locating said portions of said conductors in a first mold having a portion thereof which is smaller in section than a corresponding section of said support arm;

molding a plastic material over said portions of said conductors in said first mold to obtain a support arm blank in which said plastic material constitutes a block with said conductors;

locating said blank in a second mold having a section similar to the corresponding section of said support arm; and molding a plastic material over said blank in said second mold to obtain said support arm.

11. A method according to claim 10, wherein the plastic material used in the second mold is different from the plastic material used in the first mold.

12. A method according to claim 10, wherein end portions of the support art are formed in the first mold, and the angled portion of the blank is overmolded in an second mold.

* * * * *